US010119529B2

(12) United States Patent
Borichevsky et al.

(10) Patent No.: US 10,119,529 B2
(45) Date of Patent: Nov. 6, 2018

(54) CRYOPUMP ARRANGEMENT FOR IMPROVED PUMP SPEED

(71) Applicant: Varian Semiconductor Equipment Associates, Inc., Gloucester, MA (US)

(72) Inventors: Steven C. Borichevsky, Ipswich, MA (US); Eric D. Hermanson, Georgetown, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 668 days.

(21) Appl. No.: 14/660,567

(22) Filed: Mar. 17, 2015

(65) Prior Publication Data
US 2016/0273526 A1   Sep. 22, 2016

(51) Int. Cl.
*B01D 8/00* (2006.01)
*F04B 37/08* (2006.01)
*F25B 9/00* (2006.01)

(52) U.S. Cl.
CPC .............. *F04B 37/085* (2013.01); *B01D 8/00* (2013.01); *F04B 37/08* (2013.01)

(58) Field of Classification Search
CPC ........ F04B 37/08; F04B 37/085; F25B 29/00; F25B 9/00; F25B 9/10; F25B 9/14; F25B 9/145; B01D 8/00
See application file for complete search history.

(56) References Cited

U.S. PATENT DOCUMENTS

| 2,985,356 | A | * | 5/1961 | Beecher | F04B 37/08 62/531 |
| 4,339,252 | A | * | 7/1982 | Bell | B01J 3/06 425/DIG. 26 |
| 5,465,584 | A | * | 11/1995 | Mattern-Klosson | F04B 37/08 417/901 |
| 5,520,002 | A | * | 5/1996 | Ishikawa | C23C 14/564 417/901 |
| 6,051,053 | A | * | 4/2000 | Noji | B01D 8/00 95/133 |
| 6,368,371 | B1 | * | 4/2002 | Nomura | B01D 45/08 55/309 |
| 6,805,487 | B1 | * | 10/2004 | Yuasa | B23Q 11/0883 277/431 |

(Continued)

FOREIGN PATENT DOCUMENTS

DE   2512235 A1 *  9/1976  ............. F04B 37/08

*Primary Examiner* — Frantz Jules
*Assistant Examiner* — Erik Mendoza-Wilkenfe
(74) *Attorney, Agent, or Firm* — Nields, Lemack & Frame, LLC

(57) ABSTRACT

An apparatus including a movable cryopump that may be disposed in a first operational position and a second regeneration position is disclosed. In the first operational position, the front surface of the cryopump may be disposed in the same plane as the wall of the processing chamber, effectively serving as a part of a chamber wall. In certain embodiments, the front surface of the cryopump may extend into the processing chamber. In the second regeneration position, the cryopump is retracted into a cavity, which is isolated from the processing chamber by a movable gate. The first operational position serves to enhance the pumping speed of the cryopump, while the second regeneration position ensures that previously trapped molecules are not released back into the processing chamber.

13 Claims, 8 Drawing Sheets

(56) References Cited

U.S. PATENT DOCUMENTS

| | | | |
|---|---|---|---|
| 2006/0168844 A1* | 8/2006 | Edamura | G05D 16/2066 34/559 |
| 2015/0060691 A1 | 3/2015 | Borichevsky | |

\* cited by examiner

CRYOPUMP ARRANGEMENT FOR IMPROVED PUMP SPEED

FIELD

Embodiments of the present disclosure relate to a cryopump arrangement to achieve improved pump speed and more particularly, to a cryopump that has a first operational position and a second regeneration position.

BACKGROUND

The fabrication of a semiconductor device involves a plurality of discrete and complex processes. For many of these processes, the semiconductor device may be disposed within a chamber, which is maintained at vacuum conditions. There are various devices that may be used to create these vacuum conditions. For example, in some embodiments, a turbomolecular pump may be used. In certain embodiments, a cryopump may be employed.

A cryopump includes a front surface, through which molecules may enter. Internal to the cryopump may be surfaces cooled to extremely low temperature through the use of closed loop compressed helium or other cooled fluids. Molecules that contact the cryogenic surfaces within the cryopump lose their thermal energy, condense and change from a gaseous state to a solid state (i.e. frost or ice). This cryocondensation traps or captures the gas on the low temperature surfaces, effectively adhering to the cryogenic surface. This is the physical basis of the cryogenic pumping. In some embodiments, charcoal is used to adsorb the non-condensable molecules such as hydrogen and helium. This pumping action is known as cryotrapping.

The pumping speed S of a vacuum pump is the volumetric displacement rate or volumetric flow rate in units of L/sec. The latter definition is the value of the quotient Q/P anywhere in the vacuum system, where Q is the gas load in units of torr*L/sec and P is pressure in units of torr.

Eventually, the cryopump becomes saturated with condensate. This lowers the pumping speed and stops the cryopump from trapping any new molecules. Thus, once saturated, the condensate has to be removed. The process of removing the condensate from the cryopump is known as regeneration.

Regeneration may be performed by raising the temperature of the cryopump, so that the condensate evaporates. Once evaporated, these molecules are exhausted from the chamber. The cryopump is then cooled again, and the process repeats.

The regeneration process may cause the outgassing of the molecules that were previously captured within the cryopump. Therefore, in many embodiments, it is common to dispose the cryopump in a cavity disposed beyond the wall of the processing chamber. A movable gate is disposed in front of the cavity that contains the cryopump. When the cryopump is regenerated, the gate is closed, isolating the cavity from the processing chamber and allowing the evaporated molecules to be exhausted without affecting the processing chamber.

While this system is effective in ensuring that previously captured molecules are not released back into the processing chamber, this system has other drawbacks. For example, the front surface of the cryopump is typically set back from the processing chamber. The geometry of the volume that separates the front surface from the processing chamber may serve to limit the pumping speed, and thus, the efficiency of the cryopump.

To illustrate this concept, consider a cryopump that is in communication with a chamber via a conduit of diameter D (in cm) and length L (in cm) where L is much less than D. The conductance C in L/sec for $N_2$ gas at 25° C. is expressed as:

$$C = 9.14 * \frac{D^2}{1 + 3 * \frac{L}{4*D}}$$

The conductance C, when placed in series with a pump onto a chamber, has the effect of reducing the pump speed by:

$$S_{eff} = \frac{S*C}{S+C}$$

where $S_{eff}$ is the effective pump speed.

In present systems, the loss of pump speed may be significant. A cryopump with a $N_2$ gas pump speed of 1100 Liters per second on a conductance with a length of 12 cm and a diameter of 32 cm may reduce the pump speed by as much as 60 percent of the original pump speed. This has economic consequences in that more pumps may be added to the system to achieve the desired pump speed.

Therefore, it would be beneficial if there were a cryopump arrangement that was able to isolate the regeneration process from the processing chamber, but did not suffer from the pumping speed issues of the present systems.

SUMMARY

An apparatus including a movable cryopump that may be disposed in an operational position and a regeneration position is disclosed. In the operational position, the front surface of the cryopump may be disposed in the same plane as the walls of the processing chamber, effectively serving as a part of a chamber wall. In certain embodiments, the front surface of the cryopump may extend into the processing chamber. In the regeneration position, the cryopump is retracted into a cavity, which is isolated from the processing chamber by a movable gate. The operational position serves to enhance the pumping speed of the cryopump, while the second regeneration position ensures that previously captured molecules are not released back into the processing chamber.

In one embodiment, a pumping apparatus is disclosed. The pumping apparatus comprises a cryopump, having a front surface, disposed in a cavity; and an actuator to move the cryopump from a first operational position to a second regeneration position. In certain embodiments, the actuator is disposed inside the cavity. In further embodiments, bellows or an O-ring seal may be used to isolate the actuator from the processing chamber. In other embodiments, the actuator may be disposed outside the cavity. In further embodiments, a bearing shaft may pass through an opening in the overpressure containment structure that defines the cavity. In other further embodiments, a portion of the cryopump is disposed outside the cavity in the first operational position.

In another embodiment, a pumping apparatus is disclosed. The pumping apparatus comprises a cryopump, having a front surface, the cryopump disposed in a cavity, the cavity adjacent to a processing chamber; a movable gate to separate the cavity from the processing chamber, the movable gate having an open position and a closed position; and an actuator to move the cryopump between a first operational position where the front surface extends beyond the movable gate toward the processing chamber when the movable gate is in the open position, and a second regeneration position, where the front surface is disposed behind the movable gate, so that the movable gate can move to the closed position, isolating the cavity from the processing chamber. In certain embodiments, the front surface of the cryopump extends to an interior surface of a chamber wall, while in the first operational position, where the chamber wall surrounds and defines the processing chamber. In certain embodiments, a chamber wall surrounds and defines the processing chamber, and a liner is disposed on an interior surface of the chamber wall, and the front surface of the cryopump extends to an inward facing surface of the liner, while in the first operational position. In certain embodiments, the body of the cryopump extends beyond an interior surface of a chamber wall, while in the first operational position, wherein the chamber wall surrounds and defines the processing chamber.

In another embodiment, a pumping apparatus is disclosed. The pumping apparatus comprises an overpressure containment structure, defining a cavity, the overpressure containment structure having an opening; a cryopump, having a body and a front surface, the cryopump disposed in the cavity, the cavity being adjacent to a processing chamber; a movable gate to separate the cavity from the processing chamber, the movable gate having an open position and a closed position; a bearing shaft, attached to the body of the cryopump, passing through the opening in the overpressure containment structure; an external collar surrounding the bearing shaft, providing a vacuum seal between the cavity and an exterior of the cavity; and an actuator, disposed outside the cavity, in communication with the bearing shaft to move the cryopump between a first operational position where the front surface extends beyond the movable gate toward the processing chamber when the movable gate is in the open position, and a second regeneration position, where the front surface is disposed behind the movable gate, so that the movable gate can move to the closed position, isolating the cavity from the processing chamber. In a further embodiment, the bearing shaft comprises electrical and fluid conduits to deliver electrical signals, gasses and fluids to and from the cryopump. In certain embodiments, the pumping system further comprises a load bearing structure to support the bearing shaft, the load bearing structure in communication with the actuator and the bearing shaft, and adapted to roll on a floor or other surface.

BRIEF DESCRIPTION OF THE FIGURES

For a better understanding of the present disclosure, reference is made to the accompanying drawings, which are incorporated herein by reference and in which.

DETAILED DESCRIPTION

As described above, a cryopump may be used to remove molecules from a processing chamber, to maintain the vacuum condition within the processing chamber. Further, the cryopump has two states, an operational state where the cryopump is capturing molecules, and a regeneration state where the previously captured molecules are expelled from the cryopump.

The present pumping apparatus includes a cryopump and an actuator where the actuator serves to move the cryopump between a first, or operational position and a second, or regeneration position. By moving the cryopump, the operation of the cryopump in each state may be improved or optimized. For example, as explained above, a significant amount of volumetric flow rate (pump speed) is lost when the cryopump is mounted behind a gate valve. Thus, the pumping speed of the cryopump in the operational state is improved if the front surface of the cryopump is disposed in the processing chamber that is being maintained at vacuum. In certain embodiments, an increase of 20-60% in effective pump speed may be achieved by moving the cryopump into the processing chamber during the operational state. Additionally, the regeneration state is optimized if the cryopump can be physically isolated from the processing chamber. The present pumping apparatus achieves both of these objectives.

Figure 1A:
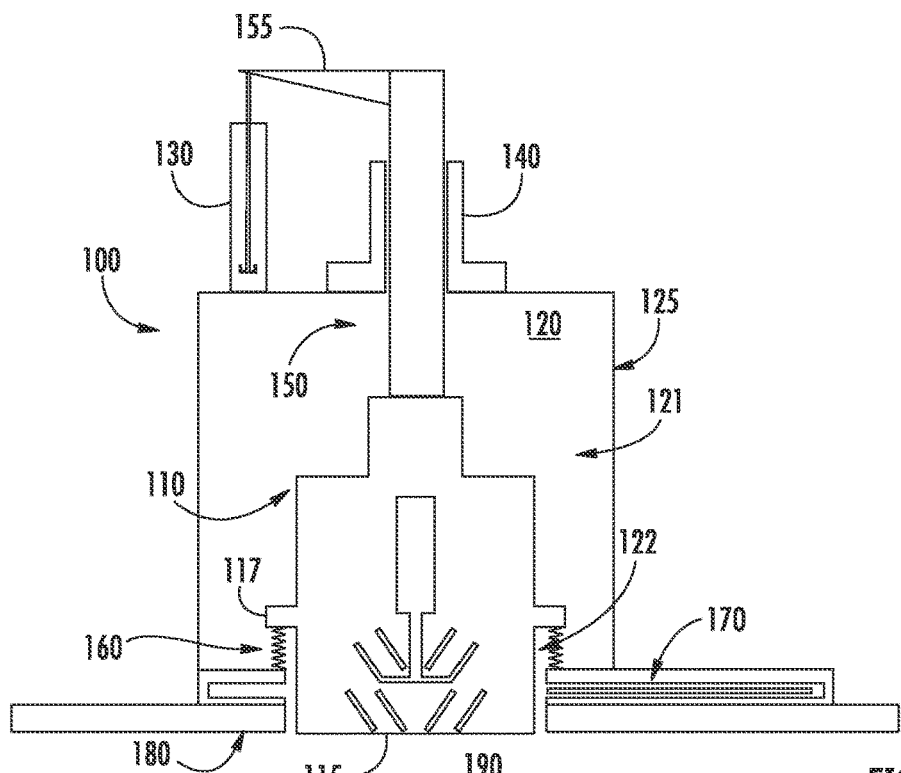
FIGS. 1A-B are block diagrams of a pumping apparatus having a movable cryopump in the operational position and the regeneration position, respectively, according to one embodiment.
Figure 1B:
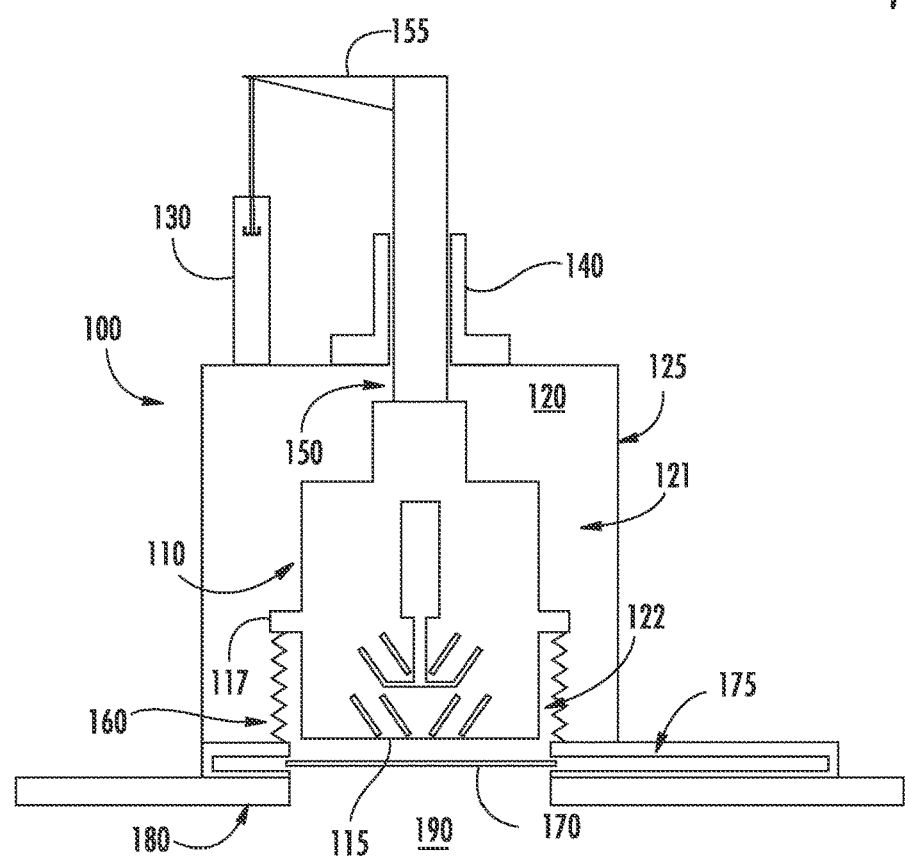

FIGS. 1A-1B shows a first embodiment of a pumping apparatus 100. The pumping apparatus 100 includes a cryopump 110, which is disposed in a cavity 120. The depth of cavity 120 is sized so that the cryopump 110 is contained within the cavity 120 in the regeneration position.

An overpressure containment structure 125 may surround and define the cavity 120. While not shown, the overpressure containment structure 125 may include means to exhaust captured gasses from the cryopump 110 during regeneration, such as vents or exhaust pumps. In certain embodiments, the overpressure containment structure 125 may include provisions to pass electrical signals, power, fluids and gasses to the cryopump 110. This cavity 120 may be adjacent to a processing chamber 190. The volume of the processing chamber 190 may be much larger than the volume of the cavity 120 in certain embodiments. The processing chamber 190 may be surrounded by and defined by a chamber wall 180. The chamber wall 180 may have a surface that faces the processing chamber 190, referred to as an interior surface of the chamber wall 180. The opposite surface of the chamber wall 180 may face the cavity 120 and may be referred to as the exterior surface of the chamber wall 180. The chamber wall 180 may have an opening that allows the cryopump 110 to communicate with the processing chamber 190.

A movable gate 170 may be used to selectively isolate the cavity 120 from the processing chamber 190. The movable gate 170 may have two positions; a first, or open position, as shown in FIG. 1A and a second, or closed position, as shown in FIG. 1B. In the first or open position, the movable gate 170 is moved so that the cavity 120, or at least a portion of cavity 120, is in communication with the processing chamber 190. More specifically, the cryopump 110 is in communication with the processing chamber 190 when the movable gate 170 is in the open position. In the second or closed position, the movable gate 170 is moved so as to cover the opening in the chamber wall 180, isolating the cavity 120 and the cryopump 110 from the processing chamber 190. The movable gate 170 may provide a fluid-tight seal between the cavity 120 and the processing chamber 190, so that particles created during regeneration in the cavity 120 cannot pass to the processing chamber 190.

The movable gate 170 may be controlled by a second actuator (not shown) which allows linear movement between the first and second positions. Of course, although linear movement is illustrated in FIGS. 1A-B, other type of movement, such as rotational, may be used to achieve the first and second positions.

The pumping apparatus 100 also includes an actuator 130, which is in communication with the cryopump 110 and is capable of moving the cryopump 110 between the first, or operational, position and the second, or regeneration, position. The actuator 130 may be any suitable actuator, such as a pneumatic piston, a linear motor, a motor driven worm drive or a rack and pinion gear drive. In the present embodiment, the actuator 130 is disposed outside of the cavity 120. This denotes that the actuator 130 is not disposed within the cavity 120 or within the processing chamber 190. In the embodiment shown in FIG. 1A-B, the actuator 130 is disposed on an exterior surface of the overpressure containment structure 125. However, other embodiments are possible. The actuator 130 may be disposed in any suitable location outside of the overpressure containment structure 125.

The actuator 130 is attached to a bearing shaft 150. The bearing shaft 150 may be used to route electrical signals and fluids to the cryopump 110. For example, power, nitrogen gas, compressed air, electrical signals, helium refrigerant supply and return lines may be routed through the center of the bearing shaft 150 to the cryopump 110. The electrical signals may be used to report the state of the cryopump 110 and send command to the cryopump 110.

A load bearing assembly 155 may be used to support the bearing shaft 150. The load bearing assembly 155 may be in the vertical position or the horizontal position and is not limited by this disclosure.

The bearing shaft 150 enters the cavity 120 through an opening in the overpressure containment structure 125. As the interior of the cavity 120 may be at a different pressure, such as vacuum pressure, an external collar 140 may be employed. Isolation between the cavity 120 and the exterior may be provided by a mechanism within the external collar 140. For example, this external collar 140 may be a differential vacuum seal or a lip seal, which isolates the cavity 120 from the exterior.

The cryopump 110 may have a front surface 115. The molecules may enter the cryopump 110 via the front surface 115 and may be captured on the front surface 115 or within the cryopump 110. In the operational position, illustrated in FIG. 1A, the front surface 115 may be in the same plane as the interior surface of the chamber wall 180 that faces the processing chamber 190. In other words, the front surface 115 may be disposed so that the front surface 115 is at the same position as the interior surface of the chamber wall 180. In this way, unlike conventional cryopump arrangements, the front surface 115 actually extends to the processing chamber 190, rather than being offset from the processing chamber 190. In certain embodiments, the front surface 115 may not be disposed in the same plane as the interior surface of the chamber wall 180. For example, the front surface 115 may extend further into the processing chamber 190, such that the front surface 115 extends beyond the interior surface of the chamber wall 180. In certain embodiments, the front surface 115 may extend outward, but not as far as the plane of the interior surface of the chamber wall 180. However, in all of these embodiments, the front surface 115 may be disposed to a position that is beyond the movable gate 170. In other words, while in the first, or operational, position, the cryopump 110 extends to such a position that the movable gate 170 cannot be closed without contacting the cryopump 110.

In the second, or regeneration, position, the cryopump 110 is moved back into the cavity 120, such that the movable gate 170 is able to move from the open position to the closed position, so as to isolate the cavity 120 from the processing chamber 190.

The displacement of the cryopump 110 between the operational position and the regeneration position may be several inches or more. In certain embodiments, the cryopump 110 may travel up to 6 inches or more.

The cryopump 110 may have a flange 117 that circumscribe the body of the cryopump 110. The surface of the flange 117 that faces toward the processing chamber 190 may be referred to as the outward facing surface, while the opposite surface may be referred to as the inward facing surface of the flange 117.

In certain embodiments, a portion of the cavity 120 is always isolated from the processing chamber 190. For example, in FIGS. 1A-B, bellows 160 may be employed to separate the cavity 120 into two portions. The first portion 121 is always isolated from the processing chamber 190, even while the cryopump 110 is in the operational position. The second portion 122 is in communication with the processing chamber 190 in the operational position, but is not in communication with the processing chamber 190 in the regeneration position. In this embodiment, the bellows 160 may have two opposite ends. The bellows 160 may be attached to the body of the cryopump 110 at one end. In certain embodiments, the bellows 160 may be attached to the outward facing surface of the flange 117 of the cryopump 110. The opposite end of the bellows 160 may be attached to the exterior surface of the chamber wall 180 facing the cavity 120.

However, in certain embodiments, the bellows 160 are not used, as the external collar 140 insures the isolation of the exterior from the cavity 120.

In certain embodiments, the movable gate 170 may move within a slot 175 that is disposed in the chamber wall 180. The bellows 160 may be attached on the exterior surface of the chamber wall 180 that is disposed behind this slot 175 so as not to interfere with the movement of the movable gate 170.

In the operational position, the bellows 160 is disposed such that the front surface 115 of the cryopump 110 is in communication with the processing chamber 190, but the body of the cryopump 110 and the first portion 121 of the cavity 120 are always isolated from the processing chamber 190. This configuration insures that any gasses, fluids or particles that are generated by the actuator 130 or the body of the cryopump 110 are not able to reach the processing chamber 190. In this embodiment, a gap may exist between the outward surface of the flange 117 and the exterior surface of the chamber wall 180 in the operational position, allowing the bellows 160 to compress without being pinched between the flange 117 and the chamber wall 180.

In the regeneration position, the bellows 160 are disposed behind the movable gate 170, such that the movement of the movable gate 170 is not affected by the bellows 160. The particular placement of the ends of the bellows on the body of the cryopump 110 and the exterior surface of the chamber wall 180 are not limited by this disclosure. In certain embodiments, the bellows 160 is attached so as to minimize the volume of the second portion 122 of the cavity 120 and maximize the volume of the first portion 121 of the cavity. Other configurations are also within the scope of the disclosure.

In this embodiment, the first portion 121 of the cavity 120 may be maintained at a different pressure than the processing chamber 190. For example, the first portion 121 of the cavity 120 may be maintained at atmospheric pressure. Thus, in certain embodiments, the bellows 160 may insure isolation of the exterior from the cavity 120. In these embodiments, the external collar 140 may or may not provide a vacuum seal.

Figure 4:
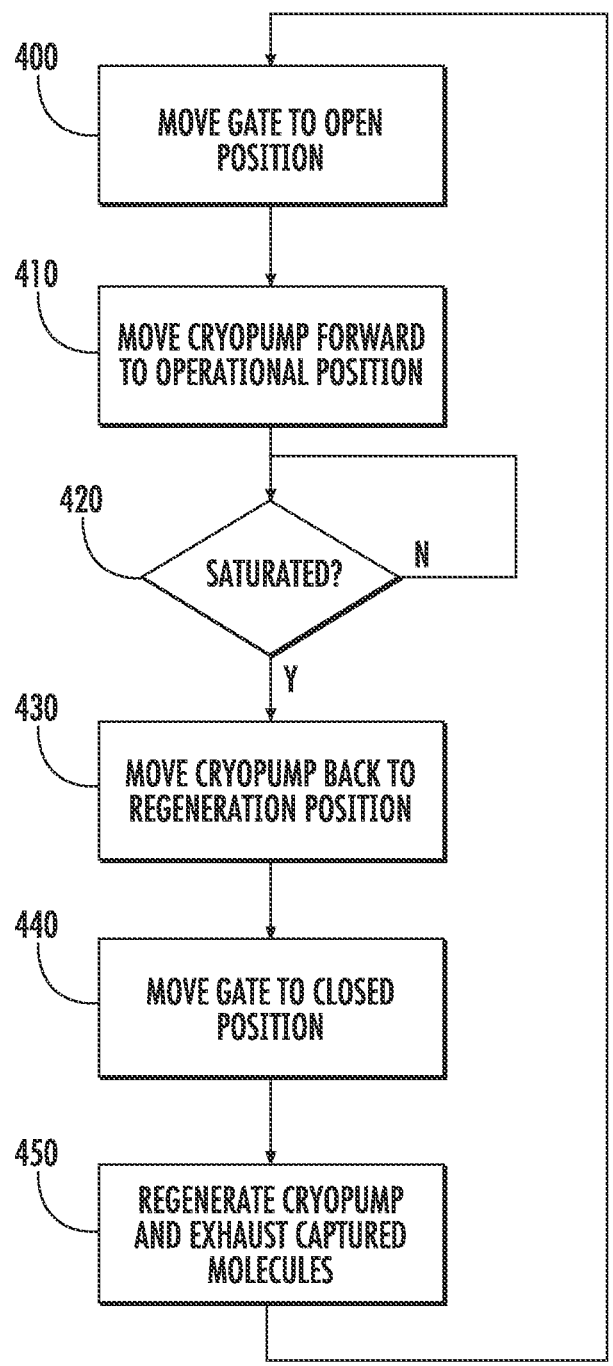
FIG. 4 is a flowchart illustrating the operating of the pumping apparatus.

The operation of the pumping apparatus is shown in FIG. 4. In operation, the movable gate 170 is moved to the open position, as shown in process 400. The actuator 130 then moves the cryopump 110 so that the front surface 115 extends beyond the movable gate 170, to the first, or operational position, as shown in process 410. In certain embodiments, the front surface 115 extends at least as far as the interior surface of the chamber wall 180. The cryopump 110 is activated and captures molecules during the operational state. As long as the cryopump 110 is not saturated, the cryopump remains in the operational state and in the operational position, as shown in process 420. When the cryopump 110 is saturated, the actuator 130 moves the cryopump 110 so that the front surface 115 is disposed behind the movable gate 170, in the second, or regeneration, position, as shown in process 430. At this point, the movable gate 170 may slide across the opening in the chamber wall 180 to the closed position, isolating the cryopump 110 from the processing chamber 190, as shown in process 440. The cryopump 110 is then regenerated, and the captured molecules are exhausted through the overpressure containment structure 125, as shown in process 450. Once the regeneration is complete and the pumping surfaces are returned to cryogenic temperatures, the movable gate 170 is again moved to the open position. The cryopump 110 can then be moved to the operational position so that the sequence shown in FIG. 4 may be repeated.

Note that throughout this process, in the embodiment of FIGS. 1A-B, the first portion 121 of the cavity is always isolated from the processing chamber 190. Therefore, the first portion 121 of the cavity 120 may be maintained at a different pressure. Further, there is no risk that debris from the body of the cryopump 110 is released to the processing chamber 190.

Figure 2A:
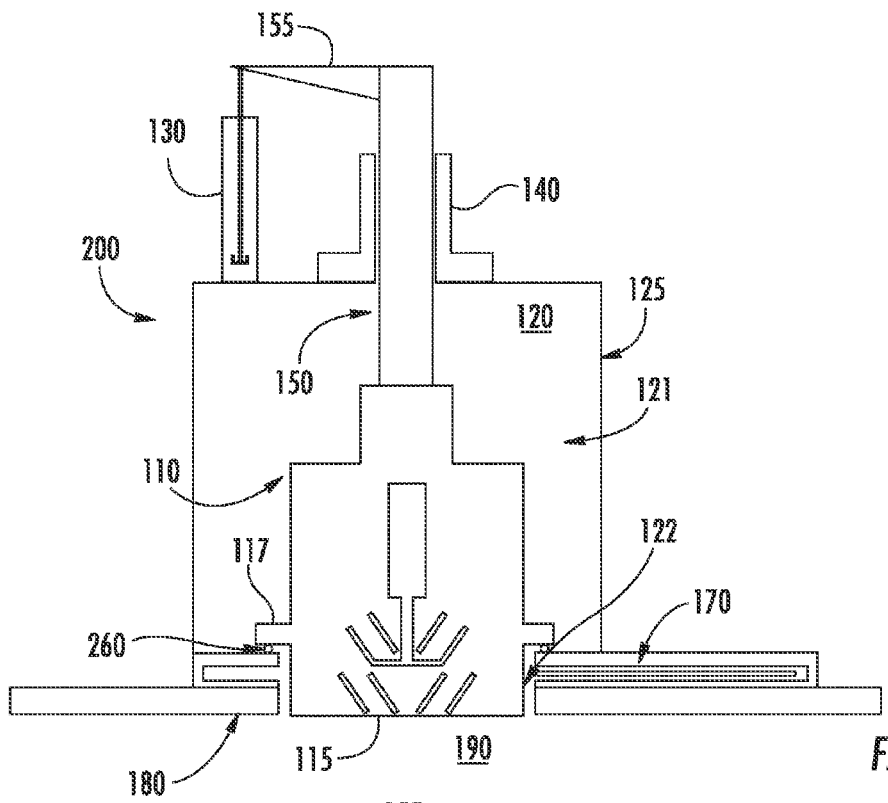
FIGS. 2A-B are block diagrams of a pumping apparatus having a movable cryopump in the operational position and the regeneration position, respectively, according to another embodiment.
Figure 2B:
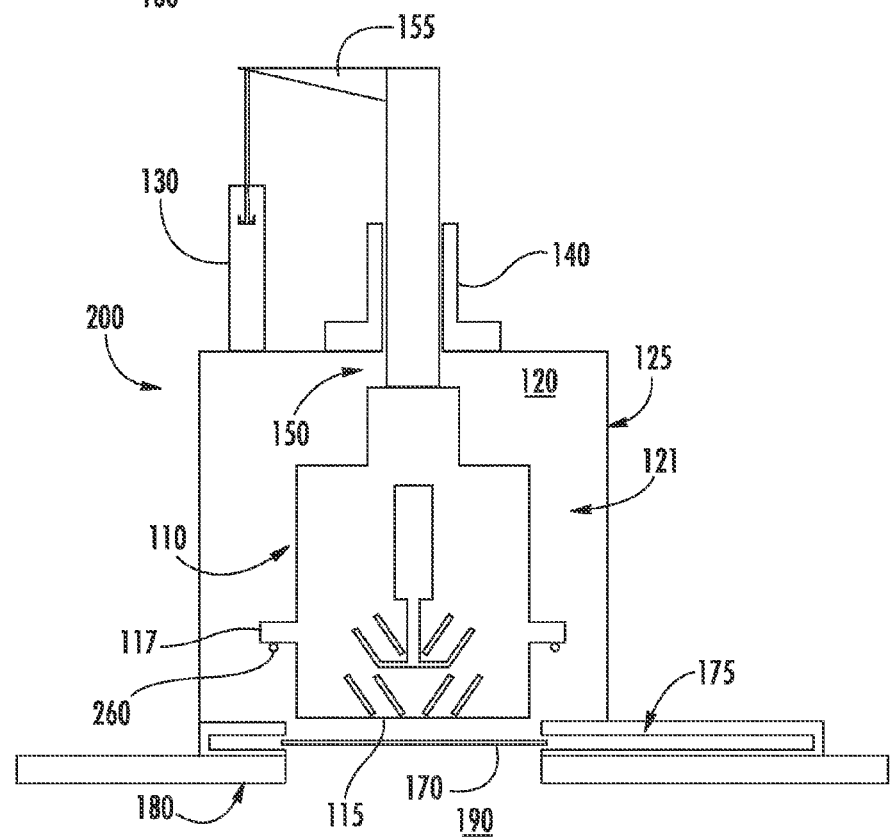

FIGS. 2A-B show another embodiment of a pumping apparatus 200. Many components in this embodiment are equivalent to those in FIGS. 1A-B. As such, these components have been given the same reference designators. Further, the operation of this embodiment is similar to that of the embodiment in FIGS. 1A-1B and is illustrated in FIG. 4.

In this embodiment, a bellows is not used. Rather, an O-ring seal 260 or other suitable seal is used to separate the first portion 121 of the cavity 120 from the processing chamber 190 while in the operational position.

Like the embodiment of FIGS. 1A-B, the cryopump 110 may have a flange 117 that circumscribes the body of the cryopump 110. This flange 117 may extend far enough from the body of the cryopump 110 so that the cryopump 110 cannot pass through the opening on the chamber wall 180. The O-ring seal 260 may be disposed on the outward facing surface of the flange 117. In this way, when the cryopump 110 is in the operational position, the O-ring seal 260 is pressed between the flange 117 and the exterior surface of the chamber wall 180. This action isolates the first portion 121 of the cavity 120 from the processing chamber 190 in the operational position. Thus, the second portion 122 of the cavity 120 is simply the volume defined by the flange 117 and the chamber wall 180.

When the cryopump 110 is moved from the operational position, as shown in FIG. 2A, to the regeneration position, as shown in FIG. 2B, the O-ring seal 260 loses contact with the exterior surface of the chamber wall 180, thus allowing the first portion 121 of the cavity 120 to be in communication with the processing chamber 190 during the transition between positions. Thus, the first portion 121 of the cavity 120 may be maintained at the same pressure as the processing chamber 190. In this embodiment, the external collar 140 may provide a vacuum seal. Prior to regenerating the cryopump 110, the movable gate 170 is moved to the closed position.

Figure 3A:
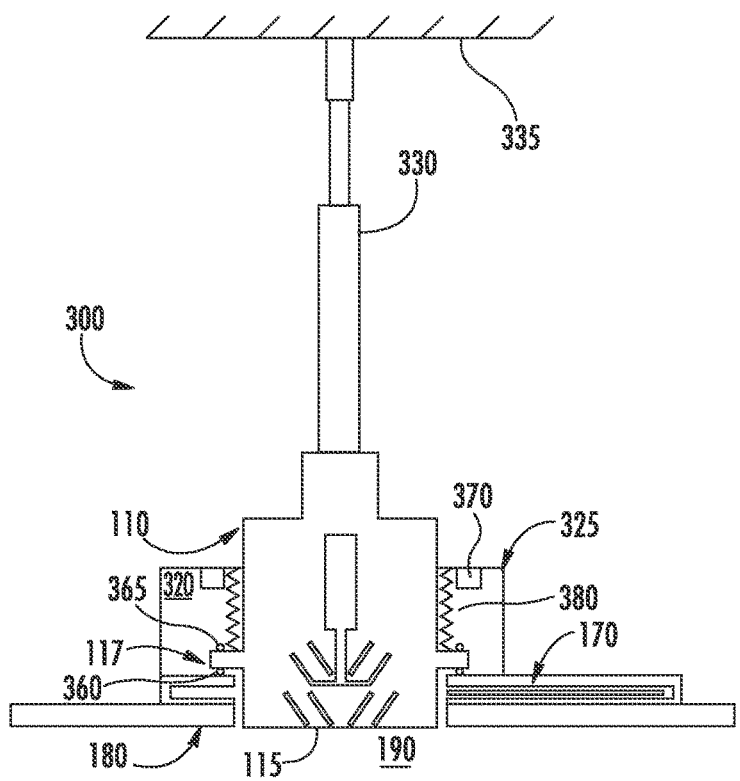
FIGS. 3A-B are block diagrams of a pumping apparatus having a movable cryopump in the operational position and the regeneration position, respectively, according to another embodiment.
Figure 3B:
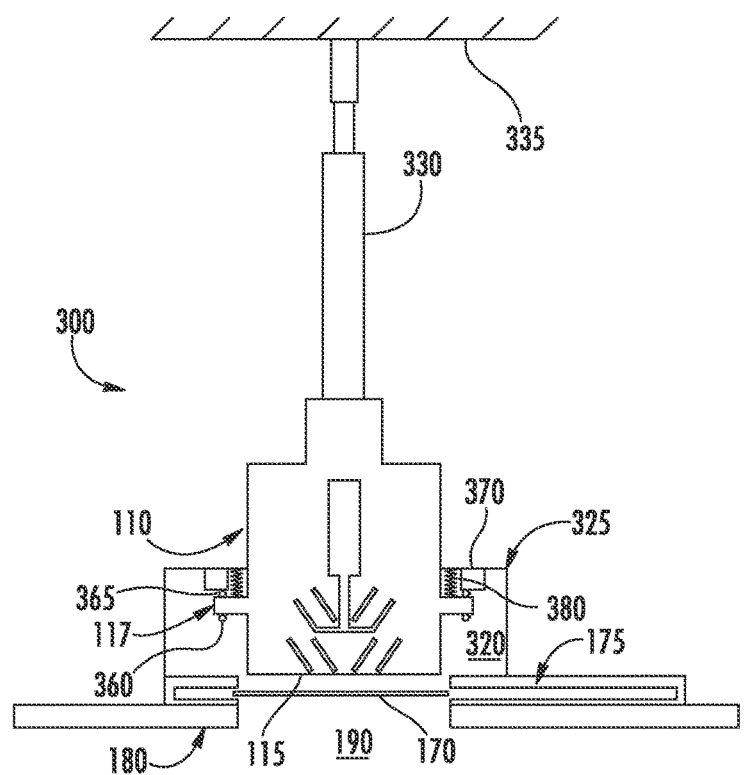

FIGS. 3A-B show another embodiment of a pumping apparatus 300. In this embodiment, the overpressure containment structure 325 may define a cavity 320, which is smaller than that shown in FIGS. 1A-B. In this embodiment, depth of the cavity 320 is sized to accommodate the movement of the cryopump 110. In other words, if the cryopump 110 moves a distance of X inches between the operational and regeneration states, the cavity 320 is at least X inches deep.

The actuator 330 is disposed outside of the cavity 320. This denotes that the actuator 330 is not disposed within the cavity 320 or within the processing chamber 190. Therefore, there is no risk of contamination of the processing chamber 190 from the cavity 320.

In this embodiment, the cryopump 110 may have a flange 117 that circumscribes the body of the cryopump 110. The flange 117 may extend far enough from the body of the cryopump 110 so that the cryopump 110 cannot pass through the opening on the chamber wall 180. A first O-ring seal 360 may be disposed on the outward facing surface of the flange 117. A second O-ring seal 365 may be disposed on the inward facing surface of the flange 117.

The overpressure containment structure 325 may also include stops 370 disposed on the top surface of the cavity 320. These stops are used to contact the second O-ring seal 365 in the regeneration state, as shown in FIG. 3B.

In certain embodiments, a bellows 380 may be used to isolate the cavity 320 from the exterior, where the actuator 330 is disposed. For example, the bellows 380 may extend from the inward surface of the flange 117 to the top surface of the overpressure containment structure 325.

In this embodiment, the actuator 330 may be in communication with the body of the cryopump 110. Since a position of the body of the cryopump 110 is always disposed outside the cavity 320, an external collar may not be employed. FIGS. 3A-B shows the actuator 330 disposed between an exterior surface 335 and the body of the cryopump 110. However, in another embodiment, the actuator 330 may be attached to the exterior surface of the overpressure containment structure 325 (similar to the configuration shown in FIGS. 1A-B). In other words, the actuator 330 may be affixed to the cryopump 110 on one end and any exterior surface at the opposite end.

In the operational position, shown in FIG. 3A, the first O-ring seal 360 contacts the exterior surface of the chamber wall 180, isolating the cavity 320 from the processing chamber 190. The front surface 115 of the cryopump 110 extends beyond the movable gate 170.

In the regeneration position, shown in FIG. 3B, the actuator 330 moves the cryopump 110 upward, until the second O-ring seal 365 contacts the stop 370, located on the top surface of the overpressure containment structure 325. In the transition between the operational position and the regeneration position, the cavity 320 is in communication with the processing chamber 190. However, since the actuator 330 is not disposed in the cavity 320, there is no risk of contamination. Further, the bellows 380 serves to isolate the cavity 320 from the exterior. Thus, the cavity 320 may be maintained at vacuum conditions, while the exterior may be at atmospheric conditions.

While FIG. 3A-B show the use of bellows 380 to isolate the exterior from the cavity 320, other embodiments are possible. For example, a vacuum seal may be used to perform this function. For example, an external collar may be disposed about the body of the cryopump 110.

Further, since a portion of the cryopump 110 is disposed outside the cavity 320, a bearing shaft may not be employed. For example, as shown in FIGS. 3A-B, the actuator 330 may connect directly to the body of the cryopump 110. In other embodiments, a bearing shaft may be used.

Figure 5A:
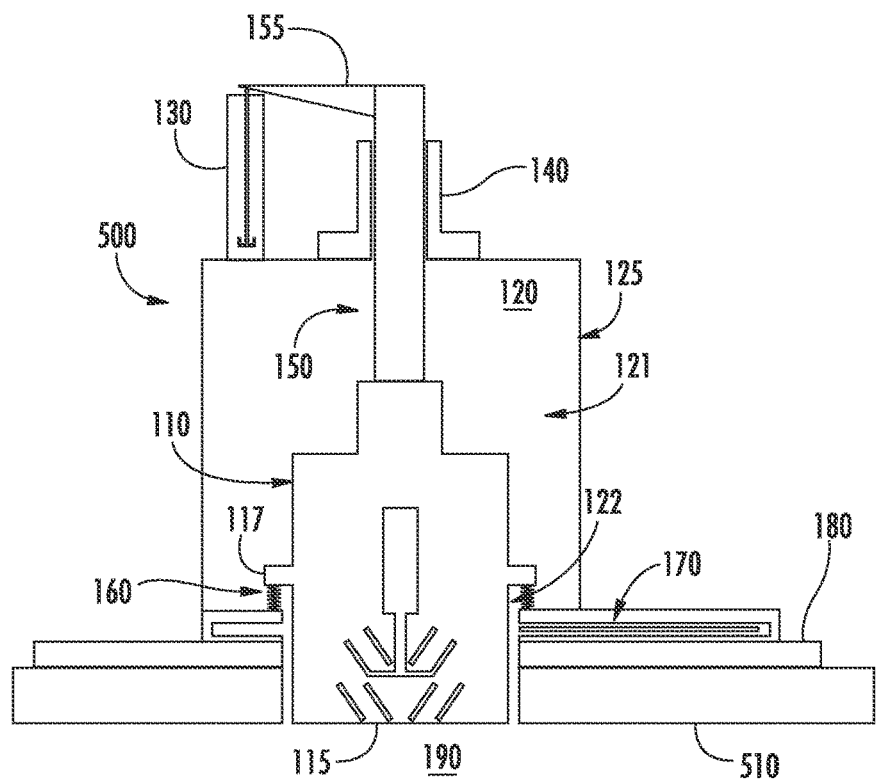
FIGS. 5A-B are block diagrams of a pumping apparatus that uses liners in the processing chamber, in the operational position and the regeneration position, respectively.
Figure 5B:
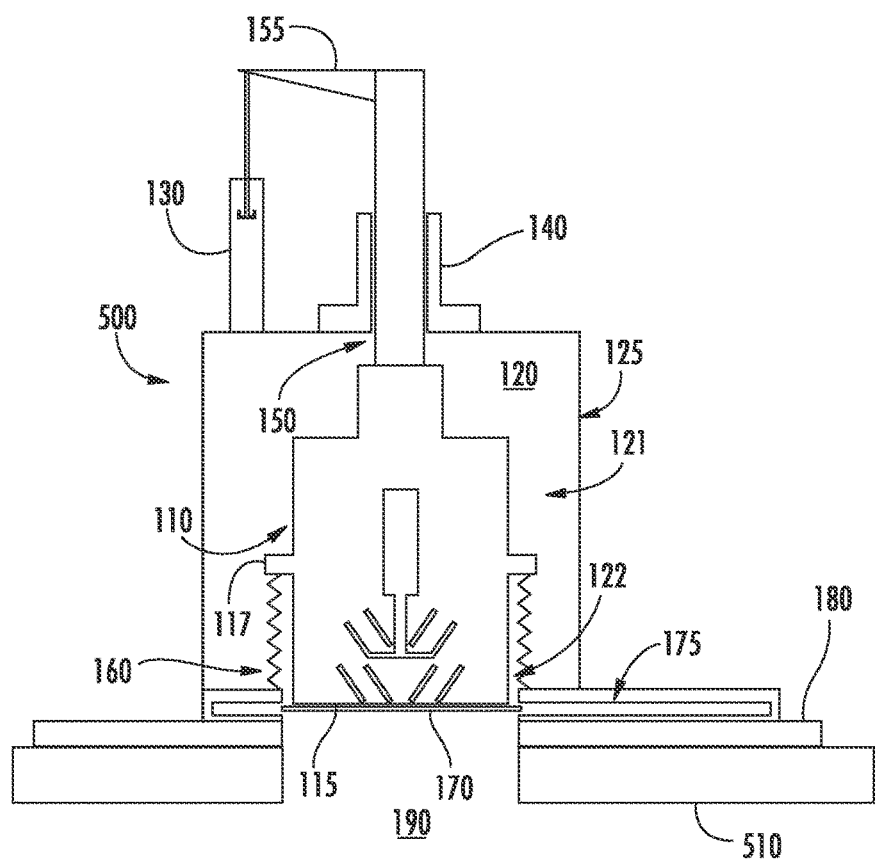

In the described figures, the front surface 115 is shown extending to the interior surface of the chamber wall 180 in the operational position. However, the disclosure is not limited to this embodiment. FIGS. 5A-B show another embodiment of a pumping apparatus 500. As shown in FIGS. 5A-B, in certain embodiments, liners 510 are disposed on the interior surfaces of the chamber walls 180 to protect the chamber wall 180. FIGS. 5A-B share many components with FIGS. 1A-B, which have been given the same reference designators and will not be described here. Further, it is also understood that the embodiment of FIGS. 5A-B operate according to the process sequence outlined in FIG. 4.

In the embodiment of FIGS. 5A-B, these liners 510 have some minimum thickness. Therefore, in certain embodiments, the front surface 115 of the cryopump 110 extends beyond the interior surface of the chamber wall 180 in the operational position. For example, the front surface 115 may extend to be in the same plane as the inward facing surface of the liner 510, as shown in FIG. 5A. Of course, in certain embodiments, the front surface 115 may extend beyond the liner 510. In other embodiments, the front surface 115 may extend beyond the interior surface of the chamber wall 180, but not as far as the liner 510.

FIG. 5B shows the pumping apparatus 500 in the regeneration position. The range of motion of the cryopump 110 in this embodiment is slightly greater due to the added thickness of the liner 510. Therefore, the cavity 120 may be appropriately sized to accommodate this increased motion so that the front surface 115 can be retracted behind the movable gate 170 when in the regeneration position.

Figure 6A:
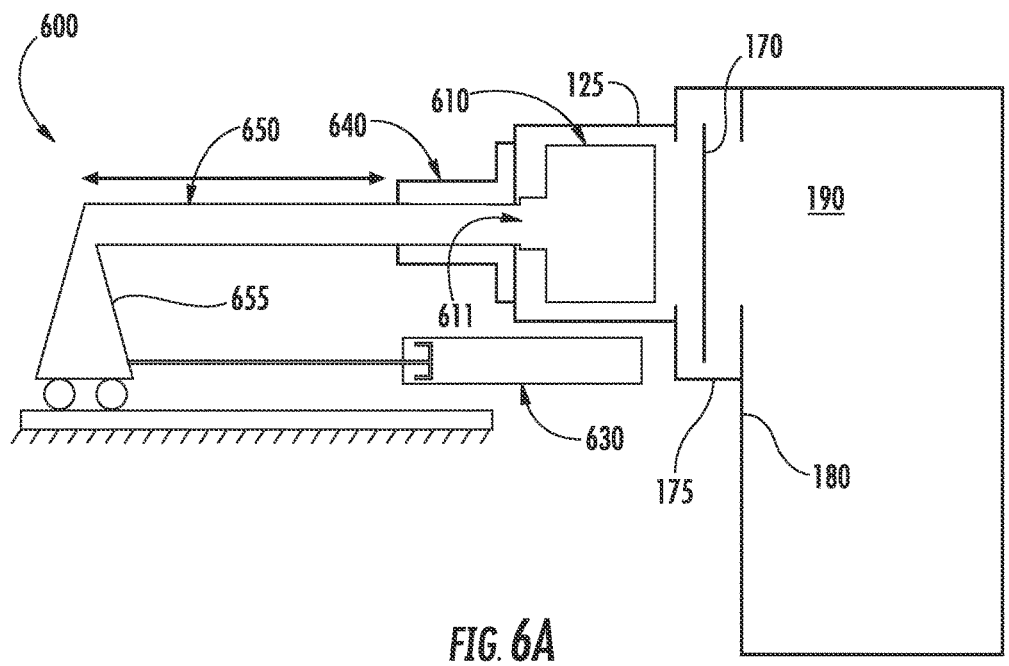
FIGS. 6A-B are block diagrams of a pumping apparatus in which the entire cryopump enters the processing chamber, in the operational position and the regeneration position, respectively.
Figure 6B:
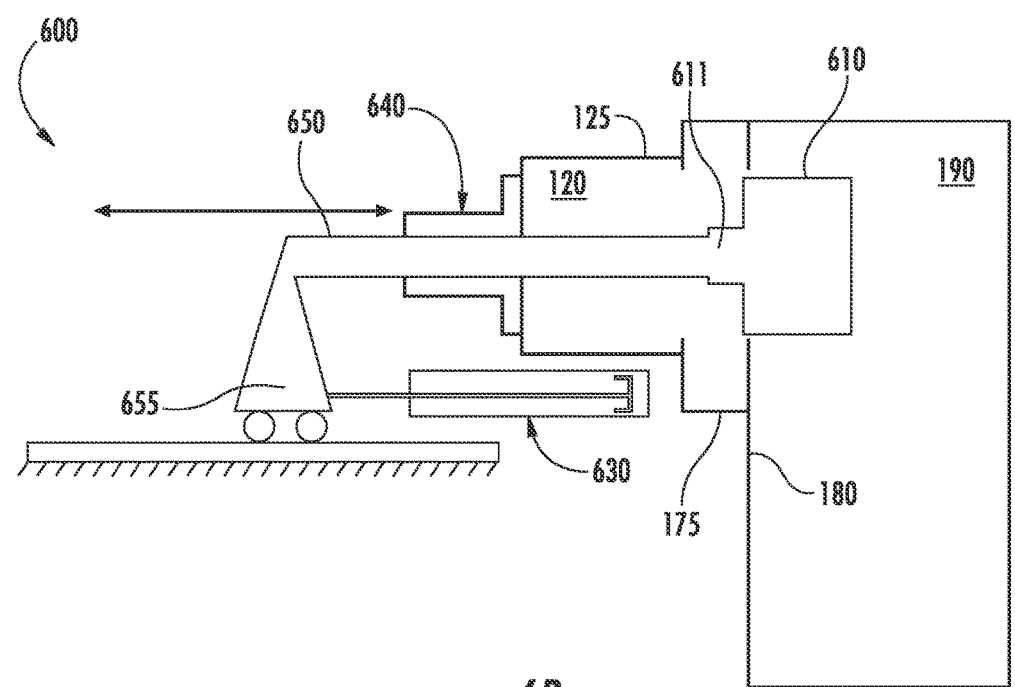

FIGS. 6A-6B shows another embodiment where the entire cryopump 610 is extended into the processing chamber 190 in the operational position. FIGS. 6A-B show a side view of the pumping apparatus 600 so that the actuator may be better depicted. FIG. 6A shows the operational position, while FIG. 6B shows the regeneration position.

Like the previous embodiments, an overpressure containment structure 125 defines a cavity 120. The cavity 120 is in communication with the processing chamber 190. A movable gate 170 contained within a slot 175 is used to selectively isolate the cavity 120 from the processing chamber 190.

In this embodiment, the cryopump 610 may include a cryopump displacer drive motor 611, which is a component of the cryopump 610. Further, the cryopump 610 may have a bearing shaft 650 that extends from the back side of the cryopump 610. In some embodiments, this bearing shaft 650 may be an integral part of the cryopump 610, such as the drive mechanism. In other embodiments, this bearing shaft 650 may not serve as a functional part of the cryopump 610, but may provide electrical and fluid connections to the cryopump 610. The bearing shaft 650 may be used to route electrical signals and fluids to the cryopump 610. For example, power, nitrogen gas, compressed air, electrical signals, helium refrigerant supply and return lines may be routed through the center of the bearing shaft 650 to the cryopump 610. The electrical signals may be used to report the state of the cryopump 610 and send command to the cryopump 610.

A load bearing assembly 655 may be used to support the bearing shaft 650. The load bearing assembly 655 may be in the vertical position of the horizontal position and is not limited by this disclosure. For example, the load bearing assembly 655 may include bearings or other mechanisms to allow the load bearing assembly 655 to roll on a floor or other surface.

As described above, the bearing shaft 650 enters the cavity 120 through an opening in the overpressure containment structure 125. Isolation between the cavity 120 and the exterior may be provided by a mechanism within the external collar 640. The external collar 640 may provide a vacuum seal between the cavity 120 and the exterior of the cavity 120. For example, this external collar 640 may include a differential vacuum seal or a lip seal, which isolates the cavity 120 from the exterior.

The bearing shaft 650 passes through the external collar 640 to enter the cavity 120. Further, the length of the bearing shaft 650 is at least as long as the range of motion of the cryopump 610. In the operational position, the cryopump 610 is extended completely into the processing chamber 190. This is achieved by actuating linear actuator 630, which is disposed outside the processing chamber 190 and outside the cavity 120. The actuation of the linear actuator 630 causes the cryopump 610 to extend into the processing chamber 190.

In the operational position, a significant portion of the bearing shaft 650 extends into the cavity 120 through the external collar 640 to allow the cryopump 610 to extend into the processing chamber 190. For example, in one embodiment, the entire body of the cryopump 610 may extend beyond the interior surface of the chamber wall 180. The entirety of cavity 120 is in communication with the processing chamber 190 in the operational position. However, since the linear actuator 630 is disposed outside the cavity 120, the risk of contamination is low. The external collar 640 isolates the exterior from the cavity 120.

In the regeneration position, shown in FIG. 6B, the linear actuator 630 is actuated, causing the load bearing assembly 655 to move, withdrawing the cryopump 610 from the processing chamber 190. The cryopump 610 is withdrawn so that the front surface 115 of the cryopump 610 is behind the movable gate 170. This allows the movable gate 170 to close, isolating the cavity 120 from the processing chamber 190. Since the bearing shaft 650 can exit the cavity 120, the cavity 120 may be sized to only contain the cryopump 610 and the cryopump displacer drive motor 611.

Figure 7A:
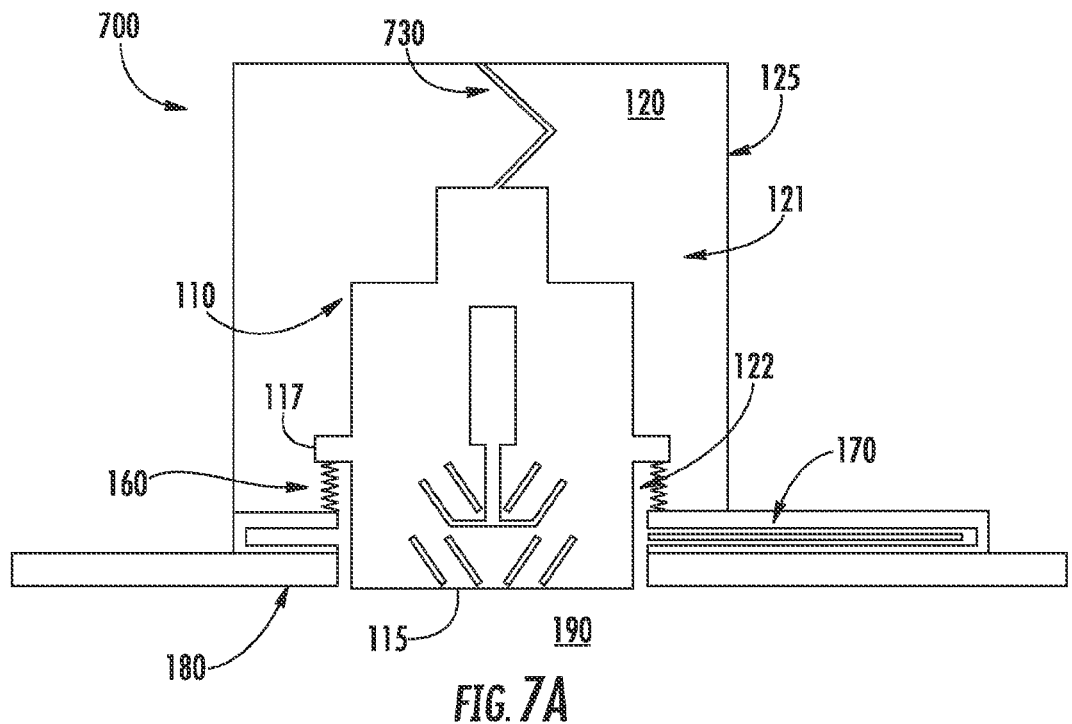
FIGS. 7A-B are block diagrams of a pumping apparatus in which the actuator is disposed inside the cavity, in the operational position and the regeneration position, respectively.
Figure 7B:
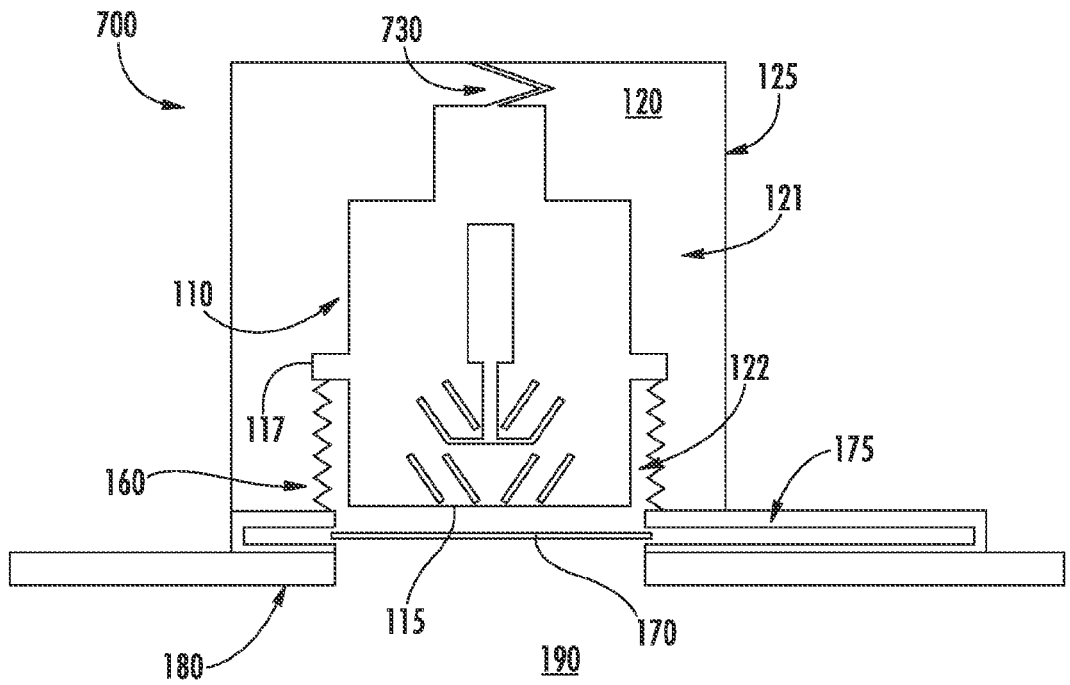

The previous embodiments all illustrate a system where a bearing shaft is used to move the cryopump from the operational position to the regeneration position. However, other embodiments are possible. For example, in a variation of the embodiment of FIGS. 1A-B, in the pumping apparatus 700, the actuator 730 may be disposed within the cavity 120, as shown in FIGS. 7A-B. As such, similar components have been given the same reference designators. FIG. 7A shows the operational position, while FIG. 7B shows the regeneration position.

In this embodiment, the actuator 730 is disposed within the cavity 120. This actuator 730 may be a pneumatic piston, a linear motor, a motor driven worm drive or a rack and pinion gear drive. In this embodiment, bellows 160 may be used. As explained above, bellows 160 separate the cavity 120 into a first portion 121 and a second portion 122, where the first portion 121 is always isolated from the processing chamber 190. Thus, in this embodiment, there is no risk of contamination of the processing chamber 190 by the actuator 730 due to the presence of the bellows 160. While bellows 160 are shown as isolating the actuator 730 from the processing chamber 190, other mechanisms may also be used.

Further, although not illustrated, other embodiments are also possible. For example, the embodiments of FIGS. 2A-B and 5A-B may be modified to incorporate an actuator 730 that is disposed within the cavity 120.

Figure 8A:
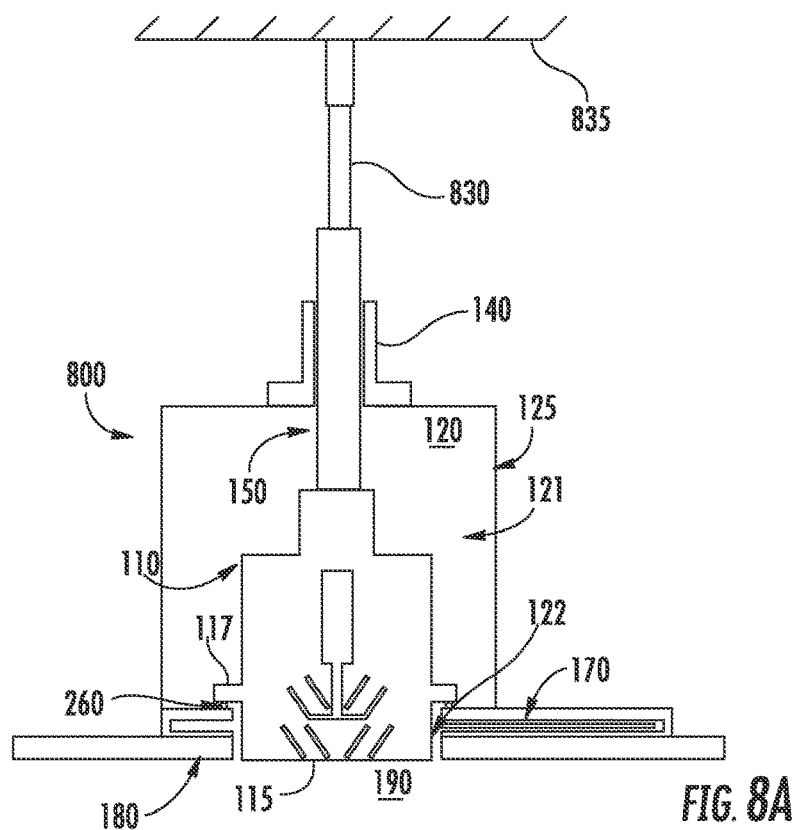
FIGS. 8A-B are block diagrams of a pumping apparatus, in the operational position and the regeneration position, respectively, according to another embodiment.
Figure 8B:
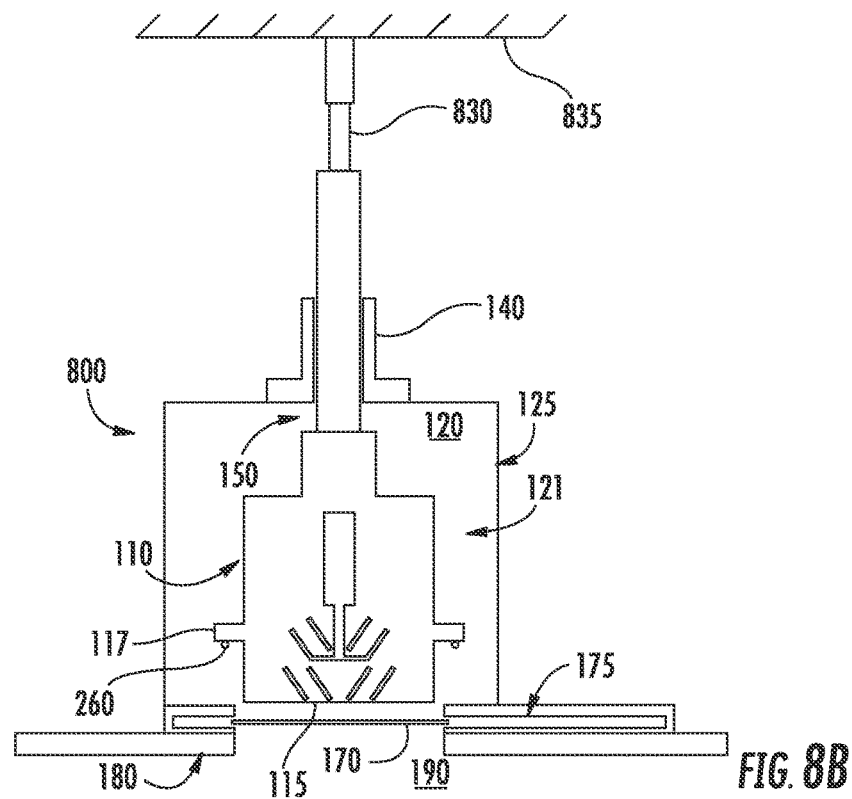

Additionally, the embodiments of FIGS. 1A-B, 2A-B, and 5A-B, all show the actuator 130 affixed to the exterior surface of the overpressure containment structure 125. However, other embodiments are also possible. For example, FIGS. 8A-B shows a pumping apparatus 800 where the actuator 830 is affixed to an exterior surface 835 that is outside the cavity 120 and the processing chamber 190. Like the earlier embodiments, similar components have been given the same reference designators. Additionally, this pumping apparatus 800 operates in accordance with the sequence shown in FIG. 4 as well.

In this embodiment, the actuator 830 is disposed on an exterior surface 835 such that the actuator 830 extends between the bearing shaft 150 and the exterior surface 835. The actuator 830 may be a pneumatic piston, a linear motor, a motor driven worm drive or a rack and pinion gear drive.

In the operational position, the actuator 830 extends to push the front surface 115 of the cryopump 110 toward the processing chamber 190. The front surface 115 may extend to any point beyond the movable gate 170. For example, the front surface 115 may extend to the interior surface of the chamber wall 180, or to the interior surface of a liner, if one is used. In the regeneration position, the actuator 830 contracts to draw the cryopump 110 back into the cavity 120 so that the movable gate 170 may be closed.

As stated above, the embodiments of FIGS. 1A-B, 2A-B, and 5A-B all show the actuator 130 affixed to the exterior surface of the overpressure containment structure 125. The embodiments of FIGS. 3A-B and 8A-B show the actuator affixed to an external surface. However, other embodiments are also possible. For example, in variations of the embodiments shown in FIGS. 1A-B, 2A-B and 5A-B, the actuator may be separate from the overpressure containment structure 125, and may attach to a load bearing structure that may roll on a floor or other surface, as shown in FIG. 6.

In other words, the actuator and load bearing structure may be designed in a number of different ways to achieve the desired goals. Further, the actuator may be affixed to various surfaces, and the disclosure does not limit how the actuator is attached.

Further, the cryopump may be disposed proximate any wall of the processing chamber 190, including the sidewalls, the top wall (or ceiling) and the floor of the processing chamber 190. For example, any of these disclosed embodiments may be disposed at a sidewall of the processing chamber 190. Additionally, all of these embodiments (except the embodiment of FIGS. 6A-B which utilizes a rolling mechanism) may be disposed at the top wall or the floor of the processing chamber 190.

This disclosure describes a variety of embodiments that can be used to move a cryopump toward and away from a processing chamber. While various embodiments are illustrated, the disclosure is not limited to only these embodiments. As such, these figures should be viewed as representative of the possible embodiments, but the disclosure is not limited to only these embodiments.

The embodiments described above in the present application may have many advantages. For example, by moving the front surface 115 of the cryopump toward the processing chamber 190 during the operational state, the efficiency and pumping speed of the cryopump is improved. This improvement in efficiency may, in some embodiments, allow a reduction in the number of cryopumps used to maintain vacuum in a particular processing chamber. Further, since the front surface 115 of the cryopump extends toward the processing chamber 190, fewer process by-products may become deposited on the movable gate 170, the slot 175 and the exterior surface of the chamber wall 180. This is due to the fact that the front surface 115 intercepts and captures the molecules before these molecules have the opportunity to deposit on one of these other surfaces. This may reduce the frequency of preventative maintenance to remove these by-products.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A pumping apparatus, comprising:
a cryopump, having a front surface through which molecules enter and interior surfaces cooled through the use of closed loop compressed helium or other cooled fluids, the cryopump disposed in a cavity, the cavity being adjacent to a processing chamber;

an actuator to move the cryopump from a first operational position to a second regeneration position; and a bellows attached at one end to the body of the cryopump and attached at a second end to a wall of the cavity so as to partition the cavity into a first portion and a second portion, wherein the first portion is isolated from the processing chamber, the front surface of the cryopump is disposed in the second portion and wherein the actuator is isolated from the processing chamber; and a movable gate to separate the cavity from the processing chamber, the movable gate having an open position and a closed position;

wherein in the first operational position, the front surface extends beyond the movable gate toward the processing chamber when the movable gate is in the open position, and in the second regeneration position, the front surface is disposed behind the movable gate, so that the movable gate can move to the closed position, isolating the cavity from the processing chamber.

2. The pumping apparatus of claim 1, wherein the cryopump is in communication with the processing chamber in the first operational position, and wherein the actuator is isolated from the processing chamber in the first operational position.

3. The pumping apparatus of claim 2, wherein the actuator is disposed inside the cavity.

4. The pumping apparatus of claim 3, wherein the bellows is used to isolate the actuator from the processing chamber.

5. The pumping apparatus of claim 1, wherein the actuator is disposed outside the cavity.

6. The pumping apparatus of claim 5, further comprising a bearing shaft in communication with the cryopump and the actuator, wherein the cavity is defined by an overpressure containment structure having an opening, and the bearing shaft passes through the opening, wherein the bellows isolates the bearing shaft from the processing chamber.

7. The pumping apparatus of claim 5, wherein a portion of the cryopump is disposed outside the cavity in the first operational position.

8. The pumping apparatus of claim 2, wherein the cryopump is isolated from the processing chamber in the regeneration position.

9. A pumping apparatus, comprising:

an overpressure containment structure, defining a cavity, the overpressure containment structure having an opening;

a cryopump, having a body and a front surface, the cryopump disposed in the cavity, the cavity being adjacent to a processing chamber;

a movable gate to separate the cavity from the processing chamber, the movable gate having an open position and a closed position;

a bearing shaft, attached to the body of the cryopump, passing through the opening in the overpressure containment structure;

an external collar surrounding the bearing shaft, providing a vacuum seal between the cavity and an exterior of the cavity;

a bellows attached at one end to the body of the cryopump and attached at a second end to a wall of the cavity so as to divide the cavity into a first portion and a second portion, where the first portion is always isolated from the processing chamber, wherein the opening and the bearing shaft are disposed in the first portion and the front surface of the cryopump is disposed in the second portion; and an actuator, disposed outside the cavity, in communication with the bearing shaft to move the cryopump between a first operational position where the front surface extends beyond the movable gate toward the processing chamber when the movable gate is in the open position, and a second regeneration position, where the front surface is disposed behind the movable gate, so that the movable gate can move to the closed position, isolating the cavity from the processing chamber.

10. The pumping apparatus of claim 9, wherein the bearing shaft comprises electrical and fluid conduits to deliver electrical signals, gasses and fluids to and from the cryopump.

11. The pumping apparatus of claim 9, further comprising a load bearing structure to support the bearing shaft, the load bearing structure in communication with the actuator and the bearing shaft, and adapted to roll on a floor or other surface.

12. The pumping apparatus of claim 9, wherein the body of the cryopump extends beyond an interior surface of a chamber wall, while in the first operational position, where the chamber wall surrounds and defines the processing chamber.

13. The pumping apparatus of claim 9, wherein the front surface of the cryopump extends to an interior surface of a chamber wall, while in the first operational position, where the chamber wall surrounds and defines the processing chamber.

* * * * *